(12) United States Patent
Sperry et al.

(10) Patent No.: US 6,272,813 B1
(45) Date of Patent: Aug. 14, 2001

(54) FOAM IN BAG PACKAGING SYSTEM

(75) Inventors: Laurence Burst Sperry; Anthony Orkin Davlin, both of Boston, MA (US); Kerry Michael McKinley, New Fairfield; George Teofilius Bertram, Newtown, both of CT (US)

(73) Assignee: Sealed Air Corporation, Saddle Brook, NJ (US)

( * ) Notice: Subject to any disclaimer, the term of this patent is extended or adjusted under 35 U.S.C. 154(b) by 491 days.

(21) Appl. No.: 08/843,274

(22) Filed: Apr. 14, 1997

Related U.S. Application Data (63) Continuation-in-part of application No. 08/626,981, filed on Apr. 3, 1996, now Pat. No. 5,699,902.

(51) Int. Cl.[7] .................................................. B65B 55/14
(52) U.S. Cl. .............................. 53/440; 53/525; 53/472; 53/123
(58) Field of Search ............................ 53/437, 440, 525, 53/472, 127, 450, 550

(56) References Cited

U.S. PATENT DOCUMENTS

| | | |
|---|---|---|
| 2,895,603 | 7/1959 | Freeman . |
| 3,073,507 | 1/1963 | Trewella et al. . |
| 3,190,442 | 6/1965 | Gauss . |
| 3,222,843 | 12/1965 | Schneider . |
| 3,229,936 | 1/1966 | Quillinan . |
| 3,307,318 | 3/1967 | Bauman . |
| 3,332,670 | 7/1967 | Swartz . |
| 3,419,134 | 12/1968 | Fitts . |
| 3,503,177 | 3/1970 | Kropscott et al. . |
| 3,543,966 | 12/1970 | Ryan et al. . |
| 3,570,375 | 3/1971 | Williams et al. . |
| 3,722,833 | 3/1973 | Inoue et al. . |
| 3,860,219 | 1/1975 | Nickerson, Jr. . |
| 3,892,060 | 7/1975 | Stanley, Jr. . |
| 4,002,289 | 1/1977 | Moore . |
| 4,049,242 | 9/1977 | Porter . |
| 4,057,047 | 11/1977 | Gossett . |
| 4,121,714 | 10/1978 | Daly et al. . |
| 4,145,449 | 3/1979 | Nelham . |
| 4,193,499 | 3/1980 | Lookholder . |
| 4,221,290 | 9/1980 | Butler . |
| 4,232,788 | 11/1980 | Roth . |
| 4,239,105 | 12/1980 | Gilbert . |
| 4,240,556 | 12/1980 | Field . |
| 4,256,256 | 3/1981 | Meyers . |
| 4,265,216 | 5/1981 | Marshall et al. . |
| 4,272,898 | 6/1981 | Tansill . |
| 4,273,689 | 6/1981 | Smearing . |
| 4,449,631 | 5/1984 | Levenberg et al. . |
| 4,449,970 | 5/1984 | Bevan et al. . |
| 4,467,588 | 8/1984 | Carveth . |
| 4,491,959 | 1/1985 | Loefberg . |
| 4,506,914 | 3/1985 | Gobeli . |
| 4,521,467 | 6/1985 | Berger . |
| 4,540,089 | 9/1985 | Maloney . |
| 4,557,377 | 12/1985 | Maloney . |
| 4,581,764 | 4/1986 | Plock et al. . |

(List continued on next page.)

FOREIGN PATENT DOCUMENTS

| | | |
|---|---|---|
| 19545120 | 6/1996 | (DE) . |
| 0 209 103 | 6/1989 | (EP) . |
| 0 243 750 | 7/1990 | (EP) . |

*Primary Examiner*—Eugene Kim
(74) *Attorney, Agent, or Firm*—Alston & Bird LLP (57) ABSTRACT

A method is disclosed for of enhancing the mixing of foam precursors in foam-in-bag precursor systems, to thereby enhance the quality of the resulting foam. The method comprises externally agitating a bag formed from plastic film material and containing separated foam-forming precursors, to thereby mix the precursors and form foam, and wherein the bag has been warmed to a temperature above ambient temperature prior to the agitation.

15 Claims, 6 Drawing Sheets

U.S. PATENT DOCUMENTS

| | | |
|---|---|---|
| 4,620,633 | 11/1986 | Lookholder . |
| 4,631,905 | 12/1986 | Maloney . |
| 4,735,675 | 4/1988 | Metz . |
| 4,787,511 | 11/1988 | McIver . |
| 4,795,265 | 1/1989 | Dahlberg et al. . |
| 4,803,086 | 2/1989 | Hedenberg . |
| 4,823,985 | 4/1989 | Grollier et al. . |
| 4,845,923 | 7/1989 | Donovan . |
| 4,889,943 | 12/1989 | Kawamura et al. . |
| 4,932,155 | 6/1990 | Friemel et al. . |
| 4,949,529 | 8/1990 | Davis . |
| 5,009,311 | 4/1991 | Schenk . |
| 5,019,432 | 5/1991 | Kawamura et al. . |
| 5,020,831 | 6/1991 | Benardelli . |
| 5,061,500 | 10/1991 | Mendenhall . |
| 5,098,228 | 3/1992 | Mauthe . |
| 5,233,981 | 8/1993 | Miyashita . |
| 5,304,056 | 4/1994 | Fetterhoff . |
| 5,316,209 | 5/1994 | Tomisawa et al. . |
| 5,348,984 | 9/1994 | Lee . |
| 5,401,264 | 3/1995 | Leise, Jr. . |
| 5,462,974 | 10/1995 | Lee . |
| 5,501,525 | 3/1996 | Cox et al. . |
| 5,536,356 | 7/1996 | Stuerzel . |
| 5,562,227 | 10/1996 | Takezawa et al. . | fig. 1.

_Fig. 9._

_Fig. 10._ fig. 11.

FOAM IN BAG PACKAGING SYSTEM

This is a continuation-in-part of application Ser. No. 08/626,981 filed Apr. 3, 1996 now U.S. Pat. No. 5,699,902 for "Foam In Bag Packaging System."

FIELD OF THE INVENTION

The present invention relates to foam-in-place packaging systems and in particular relates to the manufacture, structure, and use of bag cushion precursors that carry foamable compositions.

BACKGROUND OF THE INVENTION

The present invention relates generally to foam-in-place packaging. Foam-in-place packaging has been well known and widely used as a protective packaging method for a number of years. The underlying technology is based upon the reaction between two (usually liquid) chemicals that form a solid polymer while at the same time generating a gaseous byproduct. In particular, when isocyanate compounds react with polyols and water, the reaction produces both a urethane polymer ("polyurethane") and carbon dioxide. Under proper conditions, the carbon dioxide generated by the reaction will bubble and disperse through the polymer as it hardens to thus form an expanded polymer foam that can be used as a protective material for packaging fragile objects. The process by which the liquid precursors mix as liquids and then expand as not-yet-hardened foam takes about 20–30 seconds, thus making feasible its manipulation and use for packaging purposes.

In a first generation of foam-in-place packaging, objects to be protected were placed into containers (e.g. corrugated boxes), and wrapped or draped with a protective material such as a plastic sheet. Thereafter, the polyol component and isocyanate component were pumped from separate supplies, mixed, and then injected from a gun-like dispenser into the container. If the amount of injected mixture was appropriate, the resulting foam would essentially fill the interior of the container while surrounding the object to provide a custom package. Such relatively straight forward injection practices are still useful in many applications, and an updated injection device is disclosed, for example, in copending and commonly assigned application Ser. No. 08/361,322 filed Dec. 21, 1994 for "Hand Held Dispenser for Foamable Compositions and Dispensing System."

In a next generation of foam-in-place packaging, devices have been developed which concurrently produce plastic bags and fill them with the foamable mixture of polymer precursors. The bag has a vent to permit the carbon dioxide to escape. A packaging operator can simply drop one or more newly made bags into a container carrying an object to be packaged, and then close the container. The foam in the bags continues to expand until it likewise fills the interior of the container while forming a custom-shaped cushion around the object packaged therein. Such bag making systems provide the advantage of injecting the foam into a bag that is immediately closed, rather than requiring the operator to manually dispense the foam. As is known to those familiar with such foamable chemicals, they tend to be extremely messy and, if not controlled properly, can cause problems which slow or stop the entire packaging process until the unwanted foam residue can be cleaned up. In more serious circumstances, the foam can even cause its handling machinery to break down leading to further additional delays.

Examples of foam-in-place devices are described in a number of patents and copending applications that are commonly assigned with the present invention. These include inter alia, U.S. Pat. Nos. 4,800,708; 4,854,109, 4,938,007; 5,027,583; 5,139,151 and 5,376,219 and pending applications Ser. No. 08/121,751, filed Sep. 15, 1993 and Ser. No. 08/514,010 filed Aug. 11, 1995.

The packaging requirements of various users can, however, differ widely. Thus, any particular given foam-in-place system may not be appropriate or economically viable for every potential user. For example, users who repetitively use foam cushions on a large volume basis are probably most appropriately served by one of the more sophisticated devices such as those described in U.S. Pat. Nos. 5,376,219 or 4,800,708. For less frequent users, the smaller and more compact devices such as that illustrated in pending applications Ser. Nos. 08/121,751 and 08/514,010 may be appropriate, and as mentioned above, some users still prefer the simplest technique of using an injection system with a gun type device that dispenses the foam.

At present, however, the market lacks any foam-in-place packaging system for the less frequent user who would otherwise like to take advantage of foam-in-place packaging, but has neither the desire nor the facilities to incorporate any one of the previous mentioned foam-in-bag systems. Accordingly, it has been considered desirable to manufacture a bag in which the foam precursors are separately maintained during storage so that in use, the packaging operator can simply take one of the bags, mix the ingredients by hand (i.e. handle the bag's exterior while mixing the precursors inside), and then place the expanding bag and foam into a package for purposes identical to those just described.

To date, however, attempts at doing so have been generally unsuccessful for reasons that are best illustrated by U.S. Pat. No. 3,419,134 to Fitts, and U.S. Pat. No. 4,232,788 to Roth.

Fitts '134 discloses several variations of a foamable package and a method for forming cellular foam in which the foam precursors are placed in two separate smaller bags inside a larger bag. According to Fitts, there are rupturable walls between the bags, so that when the operator physically breaks the walls, the chemicals will mix and form foam. The Roth '788 disclosure is essentially the same from a conceptual standpoint. Each of these suffer from some significant disadvantages, however, and essentially neither has appeared on the marketplace in any significant presence.

There are several reasons for this failure. First, in order to produce foam, the two foam precursors must mix successfully and completely. Indeed, the successful total mixture of the foamable precursors is a fundamental requirement for all foam-in-place systems. Stated differently, if the foam precursors fail to mix successfully, either foam will not be produced, or the foam that is produced will be structurally inappropriate.

Thus, the Fitts disclosure demonstrates that in the bag-in-bag structure, some residue of at least one, and sometimes both, of the precursors will always tend to remain behind and unreacted on the inner walls of the separate bags. In turn, the presence of this residue raises several problems. First, the foam precursors (particularly the isocyanates) are environmentally undesirable and subject to regulation as such. In fact, they are much more undesirable than is the polyurethane foam, which is much more environmentally friendly. Thus, use of a Fitts-type bag will often result in a packaging cushion that contains some residual isocyanate, and quite possibly an inferior foam as well. Additionally, the isocyanate residue could potentially damage items being packaged that were chemically sensitive to isocyanate.

Secondly, because the Fitts and Roth-type devices often fail to permit all of the precursors to react with one another, the yield of foam is typically reduced, thus reducing their packaging effectiveness and cost efficiency. The failure to permit the precursors to react completely can also produce an "off-ratio" foam with less satisfactory—or even failure-prone—properties.

Third, in some of the Fitts-type devices, foam is essentially forced to break out of the second bag. As known to those familiar with foamable compositions, foam is best produced when it is allowed to properly expand and form within the packaging container. Foam that can't properly expand—and foam in a Fitts-type device typically will not properly expand—will lose yield and efficiency (i.e. less cubic feet of foam per pound of chemicals), will have a deficient cell structure (causing the foam to perform less properly than it otherwise could or for which it was designed), and will tend to shrink causing similar problems.

Accordingly, the Fitts and Roth devices will either have unreacted residue, or will restrict the desired expansion of the foam, or both.

As yet another disadvantage, the chemicals used to make foam are generally very sensitive to atmospheric conditions, and if exposed to atmospheric conditions, their effectiveness will be reduced or destroyed. In particular, when exposed to ambient conditions isocyanate precursors will tend to crystallize, while the polyol component will tend to lose water through evaporation, thus minimizing the effectiveness of each. Therefore, the "shelf life" of prior devices has been considerably less than is desirable.

The Fitts disclosure dates from approximately 1965, and those of ordinary skill in the art of plastics making and sealing will recognize that seals that are rupturable upon demand within such bags were generally not then available on any commercial basis, or indeed any basis at all, at the time of the Fitts disclosure.

Both Fitts and Roth demonstrate their lack of a proper understanding of the necessary relationships between and among plastic film and foam precursor technology. For example, Fitts suggests that "plastic film material" (Column 3, lines 56–70) is suitable, when in fact the great majority of ordinary plastic films are entirely too permeable to water-vapor or other gases to provide any reasonable shelf life for isocyanate foam precursors. Similarly, Roth suggests that his disclosed bag and precursor-containing "sachets" can be formed by heat-sealed polyethylene or polypropylene, when in fact both polymers—standing alone—are difficult to form into seals or pouches that will tear or rupture in the controlled fashion necessary for practical shelf-storable foam-in-place bags. Heat-sealed polyethylene has a relatively high burst strength, and rarely tears in a controlled or planned manner.

Therefore, there remains the need for a foam-in-place bag system which the end user can keep in shelf storage for an appropriate period of time and which, when it is to be used, can be easily internally ruptured to give a complete mixing of the foam precursors that eliminates precursor residue and allows proper expansion of the foam in order to form a structurally appropriate packaging cushion.

Furthermore, based on the usefulness of the bag precursors described and claimed in the '981 parent application, it has been discovered that various enhancements can increase such usefulness even further. Such enhancements are set forth in the following copending applications, all of which are filed concurrently herewith: Ser. No. 08/843,275 (abandoned) for "Gas Permeable Foam In Bag Packaging System;" Ser. No. 08/838,881 for "Foam In Bag Packaging System For Manual Use;" and Ser. No. 08/834,636 (abandoned) for "Thermally Insulated Foam In Bag Packaging Cushion." All three of these copending applications are incorporated entirely herein by reference.

OBJECT AND SUMMARY OF THE INVENTION

Therefore, it is an object of the present invention to provide a foam-in-bag system which provides shelf storage for the end user and from which a foam cushion can be manufactured by external manipulation of the shelf storable bag and which still provides for proper expansion of foam in order to form a structurally appropriate foam cushion, and without foam precursor residues.

The invention meets this object with a foam-in-place packaging system which comprises a bag formed of two sheets of flexible plastic film material closed on all four edges. A frangible seal between the two sheets defines separate interior cells in the bag. The frangible seals extend between the edges or between an edge and another frangible seal to thereby define a single cell bag when the frangible seals are broken. The cells separately contain a first and second foam precursor composition, and the bag includes means for permitting gases to vent to and from the bag as the foam precursors form foam while preventing foam or foam precursors from escaping from the bag. As a result, when the frangible seals are entirely broken, the separate cells form an interior cell in which the first and second foam precursors can mix thoroughly and react entirely to eliminate precursor residue and permit the resulting foam to expand and flow properly within the resulting interior cell of the bag.

In another aspect, the invention comprises a mixing device that complements the bag containing the foam precursors, and that forms a foam cushion from the bag and the foam precursors.

In yet a third aspect, the invention comprises the method of packaging objects using the bag containing the foam precursors, including the method of warming the bag before mixing the foam precursors to thereby enhance the mixing process, and to correspondingly enhance the quality of the resulting foam and foam cushion.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION

Figures 1, 2, 3, 4:
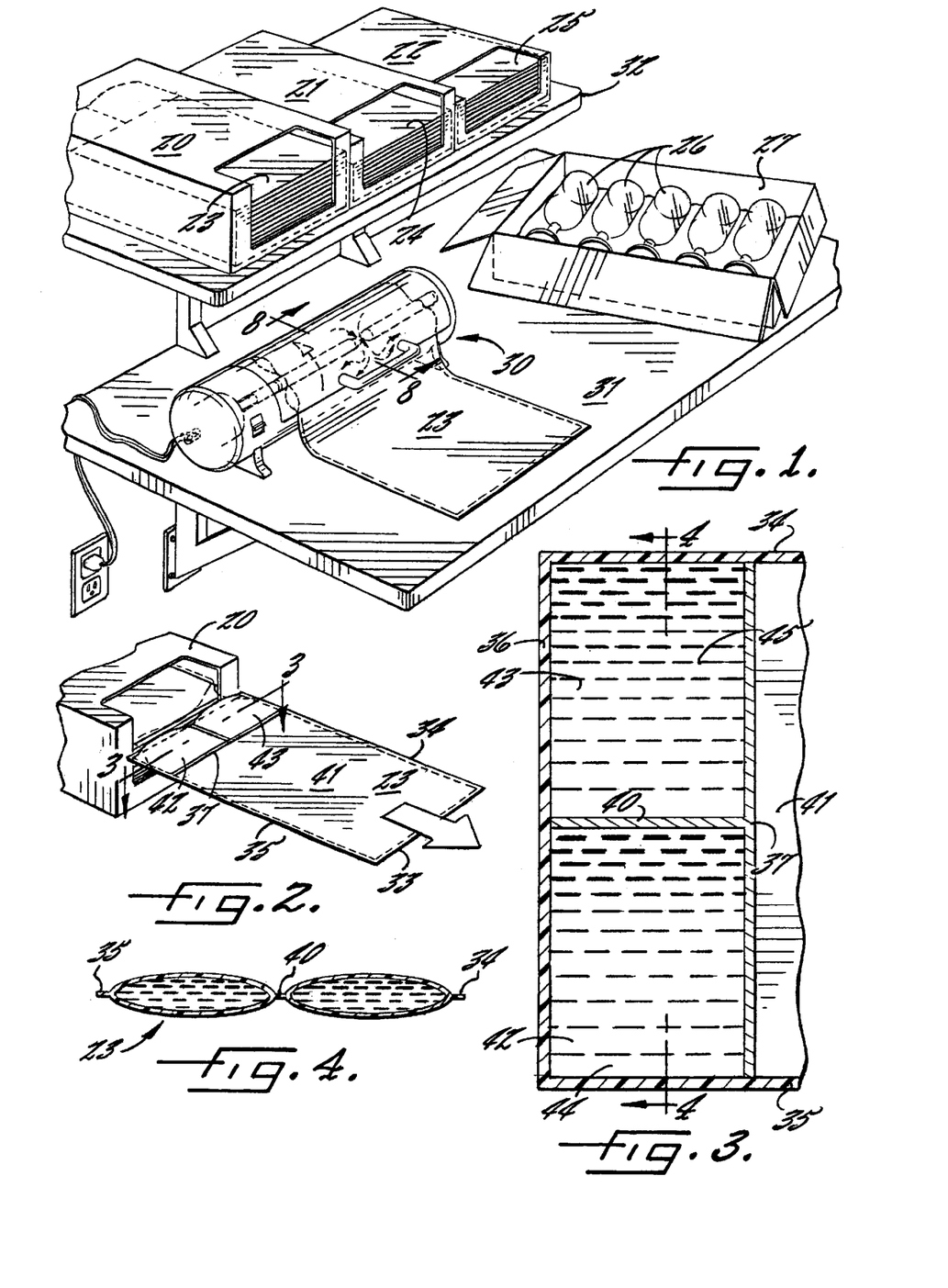
FIG. 1 is a perspective view of a packaging station that incorporates the present invention.
FIG. 2 is a perspective view of one of the bags according to the present invention.
FIG. 3 is a cross-sectional view taken along lines 3—3 of FIG. 2.
FIG. 4 is a cross-sectional view taken along lines 4—4 of FIG. 3.

FIG. 1 illustrates a packaging station that takes advantage of the features of the present invention. FIG. 1 illustrates three supply boxes 20, 21, and 22 that respectively contain three sizes of bags 23, 24, and 25 respectively, according to the present invention. As FIG. 1 illustrates, the invention is particularly useful when fragile objects such as the beverage glasses 26 are packaged in a container such as the corrugated box 27.

The precursor mixing means 30 is relatively compact and can be used on a table top 31 or similar surface within easy reach of the boxes 20, 21 and 22 on the nearby shelf 32. As will be described herein in more detail, when the mixing means 30 mixes the foam precursors, the foam precursors in the bag 23 will react to form foam at which time the bag 23 can be dropped into the corrugated container 27, after which the corrugated container can be closed so that the bag 23 will expand with its foam therein to form a custom package around the glasses 26.

The bags (hereinafter referred to for simplicity and consistency as 23) are formed of two coincident sheets of a flexible sheet material, usually a plastic film, but potentially including composite films or other suitable materials, closed on all four sides by (in the illustrated embodiment) respective and substantially hermetic edge seals 33–36. It will be understood that the closed sides could also be formed by folding the plastic sheet (e.g. three sealed edges and one folded edge), or by using tube stock (e.g. two folded edges and two sealed ends) or by any other similar arrangement.

A plurality of frangible seals 37 and 40 between the two sheets define three (or more) separate interior cells 41, 42, and 43 in the bag 23. The frangible seals 37 and 40 extend between the edge seals (e.g. frangible seal 37) or between one edge seal and another frangible seal (e.g. frangible seal 40) or potentially entirely between frangible seals (not shown) to thereby define a single cell bag when the frangible seals are broken. One of the interior cells 42 contains a first foam precursor composition 44 and another of the interior cells 43, usually an adjacent cell, carries a second foam precursor composition 45. Either or both of the cells 42 and 43 can also carry a gas that is chemically inert to the precursor composition to thereby provide additional interior volume. The increased volume provides a greater angle of attack on the frangible seals, and thus decreases the force required to break those seals 37, 40 when exterior pressure is applied to the bag 23 in a manner discussed further hereinafter.

The bag further comprises means (FIG. 5) for permitting gases to vent to or from the bag as the foam precursors form foam while still preventing foam or foam precursors from escaping.

As a result, when the frangible seals 37 and 40 are broken, the separate cells 41, 42, and 43 thereby form a single interior cell in which the first and second foam precursors 44 and 45 can mix thoroughly and react entirely to eliminate precursor residue and permit the resulting foam to expand and flow properly within the resulting interior cell of the bag 23.

Stated differently, the invention provides a foam-in-bag system in which the foam precursors are stored, mixed, and cured in the same chamber.

Although the present illustrations show the precursor cells 42 and 43 at one end of the bag 23, it will be understood that the position of the cells and the frangible seals is not limited to the illustrated orientation, and the seals can be positioned elsewhere, provided that the seals are frangible and that a bag results in which the foam can react completely and expand as desired.

Figure 5:
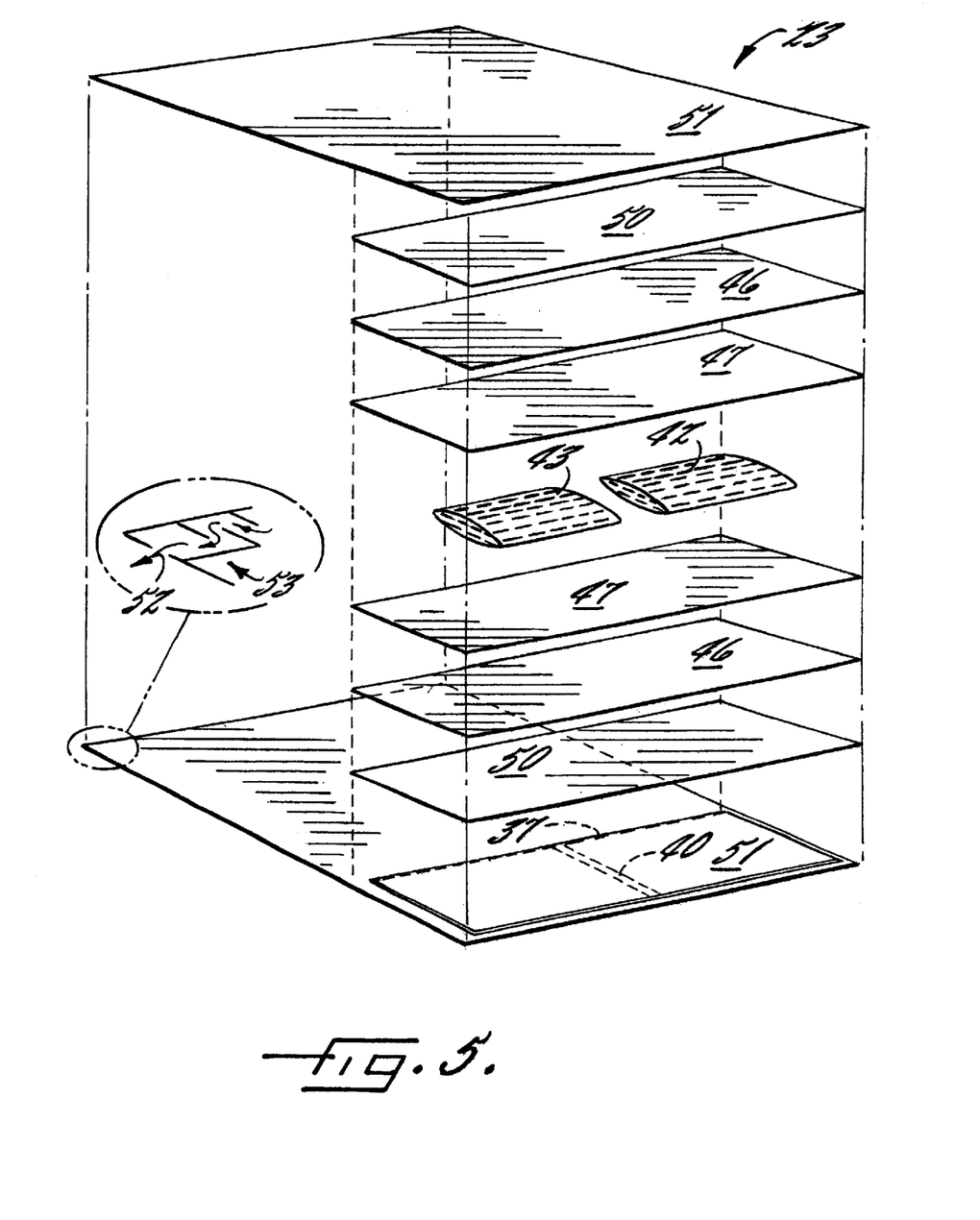
FIG. 5 is a perspective exploded view of one of the bags according to the present invention.

FIG. 5 illustrates a number of additional features of the bag. First, in order to prevent the foam precursors from reacting with each other sooner than desired, or from escaping from the bag during shelf storage, or from reacting with the ambient surroundings, the portions of the plastic sheets that form the cells 42 and 43 with the first and second foam precursors 44 and 45 therein are substantially impermeable to water vapor. Preferably, the plastic sheet portions have a water vapor transfer rate as low as 0.0010 or less (grams of water per twenty-four hours per 100 square inches at 100° F. at 100% relative humidity). Although certain polymers can provide such a vapor barrier (e.g. the ACLAR™ fluorocarbon films available from Allied-Signal, Inc. of Morristown, N.J.), the vapor barrier is most preferably provided by incorporating a metal foil layer illustrated at 46 in FIG. 5 on those portions that border the foam precursors 44 and 45. The water vapor transfer rates affect the shelf life of the bags 23. Thus, higher transfer rates are acceptable where shorter shelf life is acceptable, and materials with lower transfer rates can be incorporated where longer shelf life is desired or necessary.

In the illustrated embodiment, and in order to form the frangible seal, the plastic sheet portions further comprise an innermost layer formed of a heat sealable polymer resin for which the strength of the heat seal is a function of the heat sealing temperature applied to the resin. Appropriate resins can include ionomers; i.e. copolymers of ethylene and vinyl monomers with an acid group, such as methacrylic acid. As known to those familiar with polymer structures, ionomers are cross-linked with ionic linkages as well as covalent bonds. The SURLYN™ resins from Du Pont (e.g. SURLYN™ AD8273) are examples of such ionomers. For prolonged shelf life, however, SURLYN™ appears to be less advantageous because of its sensitivity to various other chemicals, including typical foam precursors. Nevertheless, these ionomers permit frangible seals to be formed over a relatively wide range of temperatures (e.g. 180° F.–210° F.), and thus at desired varying strengths. As will be discussed herein, the temperatures required to form the frangible seals are generally much lower than those required to create the hermetic edge seals thereby enhancing the feasibility of creating both types of seals in one bag.

Thus, in one embodiment of the invention, one way to make the frangible seals is to apply a sheet of the SURLYN™ ionomer as illustrated in FIG. 5, and then use a sealing die or similar heating device to heat the SURLYN™ layer to the desired temperature thereby forming the frangible seals of the desired strength.

It will be understood, however, that there are a number of other ways of making such frangible seals, for example zone patterning of thermoplastic materials or even an appropriate adhesive, and thus the SURLYN™ sheet of the illustrated embodiment is exemplary rather than limiting of the present invention. A presently preferred technique is set forth in copending application Ser. No. 08/838,881, filed concurrently herewith, which discloses other techniques for making frangible seals, and is incorporated entirely herein by reference.

FIG. 5 further illustrates that the plastic sheet portions include a layer of polyester 50 which provides strength and abrasive resistance to the overall plastic film material, and which has a sufficiently higher melting point (e.g. over 390° F.) than the SURLYN™ ionomer to permit the SURLYN™ layer 47 to be heat sealed at temperatures that do not affect the polyester layer 50.

The structure is completed by an overlying sheet of high density polyethylene (HDPE) 51. Polyethylene offers good mold definition, a high melting point (e.g. 275° F.), excellent resistance to many chemicals, high tensile strength and other desirable characteristics for the outermost layer of plastic.

It will be understood, that each of the layers, particularly the ionomer 47, the polyester 50 and the polyethylene 51, can be formed of a blend of such resins rather than a single resin, or as multiple layers of similar materials that are included for various purposes. Such variations are well understood to those of ordinary skill in the polymer arts, however, and will not otherwise be discussed in detail herein.

It will be further understood that polyethylene and polyester are preferred exemplary polymers for the various layers, and that the invention, or any particular layer, is not limited to these polymers, but can be formed of other polymers suitable for the same purpose and which can be selected by those of ordinary skill in these arts without undue experimentation.

In many applications, particularly the packaging of electronic components, the sheet material that forms the bag can be selected or modified to exhibit antistatic properties. Appropriate antistatic agents or coatings are generally well known in this art, and can be likewise selected without undue experimentation (e.g. Lewis, Hawley's Condensed Chemical Dictionary, 12 Ed. (1993) at page 91).

Accordingly, in its preferred embodiment, the bag has an innermost layer 47 formed of the heat sealable polymer resin, a layer of metal foil 46 on the outer surface of the heat sealable layer, a polyester layer 50 on the outer surface of the metal foil layer, and an outermost layer 51 of polyethylene.

As discussed elsewhere herein and as generally known in these arts, the most common and useful type of foams are often formed from polyurethanes, so that one of the foam precursors will usually be a polyisocyanate, and the other foam precursor will be a hydroxyl containing composition such as ethoxylated and propoxylated glycerin. The precursors typically contain other materials such as water, catalysts and surfactants to produce foam of the desired characteristics.

Accordingly, and as is generally well known in these arts (and as can be tailored without undue experimentation), the amount of surfactant and water included are adjusted to give the appropriate foam characteristics at the temperature at which the chemicals are mixed.

In this regard, because the present invention is an off-the-shelf system in which the foam precursors can be used at ambient temperatures, as well as after being heated as described later herein, it has been found useful to increase the amount of surfactant, particularly silicone surfactant, in the composition to obtain the proper foam characteristics when the expected end-use temperatures are between about 60 and 100° F. Also, the amount of water incorporated can be controlled. For example, a foam that produces a density of about 0.3 pounds per cubic foot at 140° F. will produce a denser (and thus more expensive) foam of about 0.45 pounds per cubic feet at room temperature. Adding more water to the precursor formulation will, however, generally lower the foam density at lower temperatures in a manner generally well understood in this art.

FIG. 5 also illustrates that the venting means comprises a small opening 52 in one of the edge seals that is surrounded by a pattern of partial seals generally designated at 53 on the interior of the bag 23 that permit gases to pass while substantially blocking foam and foam precursors. In preferred embodiments, the bag 23 has one of the openings 52 in each of the corners of the bag opposite and furthest from the cells 42 and 43.

In a second embodiment, the bag 23 can be formed of first and second bags, with the second bag within the first bag. The first bag is formed of the two sheets 51 of the first plastic film material (preferably polyethylene as just set forth), sealed—or closed in some other manner as noted earlier—on all four sides by four respective edge seals. The remaining layers form a second bag within the first bag so that the second bag is formed of two sheets of a second plastic film material (preferably the layered combination of materials just described) sealed on all four sides. In the illustrated embodiment, three of the four sealed edges of the second bag are aligned and substantially coincident with three of the four sealed edges of the first bag. The fourth sealed edge of the second bag is a frangible seal and a fifth seal in the second bag divides a second bag into the two cells that contain the two foam precursors.

It will be understood, however, that in alternative embodiments one, two, or perhaps none of the closed edges of the second bag may be coincident with the edges of the first bag, depending on the desired position of the second bag within the first. Accordingly, sealed edges of the second bag that are not coincident with an edge of the first bag can be formed of frangible seals so that when the frangible seals of the second bag are broken, the first and second bags form a single cell.

In both embodiments, either the second bag, or the cells defined in a single bag, is proportionally smaller than the first bag based on the amount of foam precursors present and the expected volume of foam that the precursors will form.

Thus, the second embodiment is perhaps best understood with respect to FIG. 3 in which the four edge seals of the first bag are illustrated in FIGS. 2 and 3 at 33, 34, 35, and 36. The three coincident seals of the second bag will align with seals 34, 35 and 36, the fourth sealed edge of the second bag is illustrated by the frangible seal 37 in FIG. 3, and the fifth and frangible seal in the second bag is illustrated by the frangible seal 40 in FIG. 3.

In a third embodiment, the bag 23 can be formed of adjacent first and second bags joined to one another along a frangible seal. Another frangible seal divides the second bag into the two cells that hold the foam precursors in the manner already described. When the respective frangible seals are broken, the first and second bags form the single interior cell in which the foam precursors react and expand as described earlier. In this third embodiment, the bag 23 would in all other respects have the same general appearance as illustrated in, for example, FIGS. 2 and 3.

The foam-in-place packaging system of the present invention further comprises means for rupturing the frangible seals and mixing the precursors. The mixing and rupturing means is broadly designated at 30 in FIG. 1, and its structure and operation are best illustrated in FIGS. 6 through 9.

Figure 6:
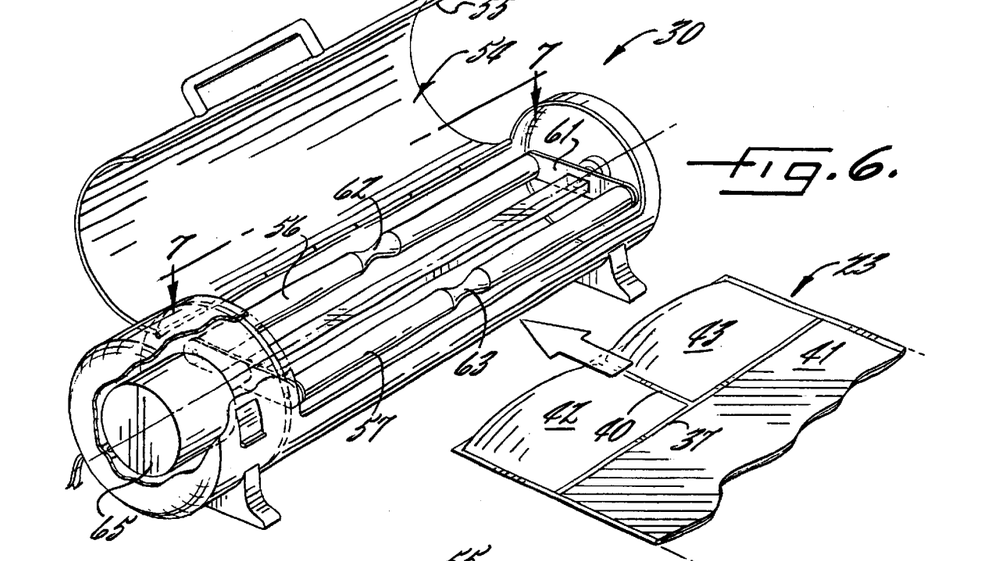
FIG. 6 is a perspective view of the device for rupturing the frangible seals in the bag and mixing the foam precursors according to the present invention.
Figure 7:
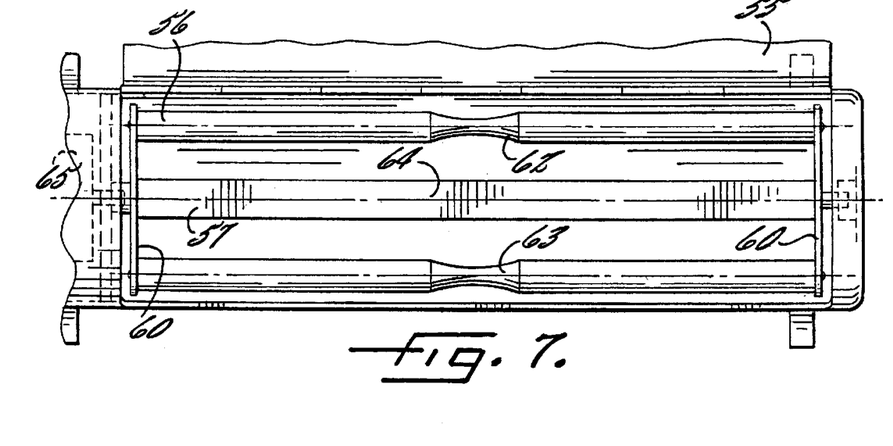
FIG. 7 is a top plan view taken along lines 7—7 of FIG. 6.

FIG. 6 illustrates that the mixing means 30 includes the generally cylindrical chamber broadly designated at 54 and a clamping lid shown at 55. The chamber 54 is of a size to receive the precursor containing cells 42 and 43 of the bag 23. The clamping lid 55 initially clamps the cells 42 and 43 and the frangible seals 37 and 40 in the chamber apart from the majority of remaining cell 41 of the bag 23.

Means, shown as the rollers 56 and 57 in the chamber 54, rupture the frangible seals 37 and 40 and thoroughly mix the foam precursors 44 and 45 while the cells 42 and 43 are clamped in the chamber 54. As perhaps best illustrated in FIG. 8, the rollers 56 and 57 rotate on their own respective axes while their respective axes orbit about the axis of the cylindrical chamber. This rotary and orbital motion of the rollers 56 and 57 creates an aggressive peristaltic agitation that thoroughly mixes and combines the foam precursors. The rollers create a consistent foam of the proper precursor ratio independent of any direct external contact with the foam chemicals or any application of heat.

Figure 8:
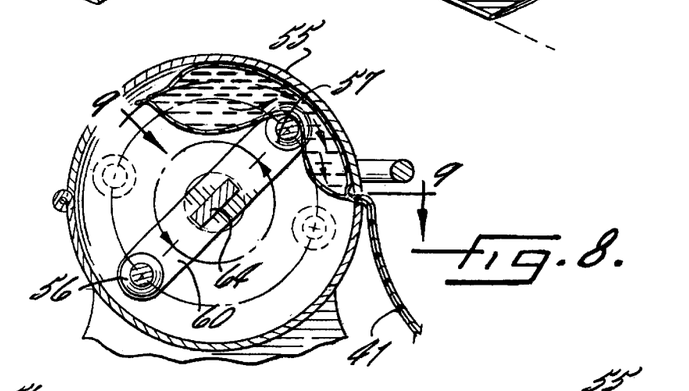
FIG. 8 is a cross-sectional view taken along lines 8—8 of FIG. 1.

As FIG. 8 further illustrates, the rollers 56 and 57 are arranged on end plates 60 and 61. Each of the rollers includes at least one axial portion illustrated at 62 and 63 respectively that is narrower than the remaining axial portions to thereby define a space at which the foam precursors 44 and 45 will initially mix under the pressure applied by the rollers 56 and 57, but without rupturing the edge seals or plastic film of the bag. These narrower axial portions or "grooves" 62 and 63 provide a constant escape path for the converging chemicals. It will be understood that although FIG. 6 illustrates the narrower portions 62 and 63 centrally along the rollers 56 and 57, they can also be located in different positions to complement the structure of the bag and the positions of the frangible seals.

The mixing means 30 also includes a horizontal bar 64 (FIG. 7) which also rotates freely on a common axis with the axis of the cylindrical chamber 54 and which generally makes it somewhat easier to load a bag 23 into the mixer 30.

Figure 9:
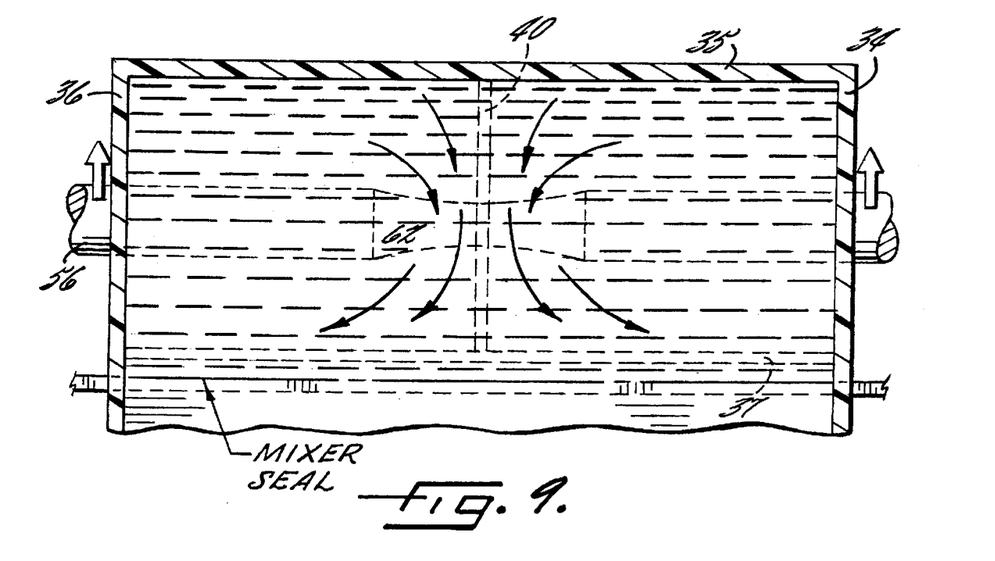
FIG. 9 is a cross-sectional view taken along lines 9—9 of FIG. 8.

In operation, the mixer 30 provides a relatively short (3–5 second) mixing cycle which includes the steps of breaking the frangible seals, premixing the precursors, more fully mixing the precursors, and returning to a home position. More particularly, when the mixing cycle begins, the mixing rollers 56 and 57 rotate to position the bag against the mixing chamber. The rollers continue to rotate to compress the precursors 44 and 45 inside the two cells 42 and 43 against the center frangible seal 40 (FIG. 9). The increased pressure ruptures the center frangible seal, after which the force of the rotating rollers continues to direct the precursors against the frangible seal 37 between the precursor containing cells 42 and 43 and the remaining cell 41 of the bag 23, causing the frangible seal 37 to zipper open. In preferred embodiments to date, this process takes approximately 0.3 seconds. As noted earlier herein, the presence of an inert gas in one or both of the cells can provide an additional (and tailored) amount of volume during the seal-breaking and precursor-mixing steps.

After the frangible seals 37 and 40 are broken, and in order to fully mix the chemicals, the rollers 56 and 57 are then driven at relatively high speed (about 200–300 rpm) to aggressively mix and blend the precursors. The constant pattern of pressurization and depressurization causes a turbulent flow of precursors that increases the mixing effectiveness. This portion of the process takes approximately two seconds.

After the mixing cycle is complete, the rollers 56 and 57 slowly rotate back to a home position through the use of a proximity switch. This home position process takes about one rotation at 30 rpm.

Although not all details are illustrated, in preferred embodiments the inner surface of the cylindrical mixing chamber 54 preferably contains a rubber pad against which the rollers compress the cells 42 and 43 to maximize chemical extrusion. The rubber pad can contain grooves complementing the grooves 62 and 63 in the rollers 56 and 57 to provide a flow channel for the chemicals during mixing.

The clamping lid 55 retains the bag with its cell section in the mixer 30 to securely hold the bag 23 in proper position during chemical mixing. The clamping lid 55 also provides a barrier that ensures proper pressurization during the frangible seal breaking cycle.

In preferred embodiments the rollers are driven by a motor 65 (FIG. 6) which can be a low cost direct current (dc) motor. Preferable torque requirements are 900 ounce-inches at 0 rpm and 80 ounce-inches at 300 rpm. The motor output can be adjusted or alleviated with gear reduction, timing belts, and pulleys in a manner quite familiar to those of ordinary skill in this art. In a preferred embodiment, the motor actuator is fully enclosed within the mixing machine and includes a safety switch so that if the clamping lid 55 is opened during the mixing cycle, the motor is immediately disengaged.

The present invention provides all of the benefits of traditional foam-in-place packaging, and the bags can be provided in a variety of sizes and foam densities. The invention is simple to use, requires minimal user training, and its cost is generally limited to the cost of the mixing machine and the number of bags desired. The invention is compact and requires minimal work and storage space, with an appropriate mixer being as small as ten inches by twenty inches by six inches.

The bags of the present invention virtually eliminate chemical exposure and eliminate the need for chemical drums, pumps, cleaning solvents, and cleaning devices. Similarly, the service and maintenance requirements are minimal, and the system is entirely portable.

In another aspect, the invention is a method of enhancing the mixing of foam precursors in foam-in-bag precursor systems to thereby enhance the quality of the resulting foam and the resulting foam cushion. In this aspect, the method comprises externally agitating a bag formed from plastic film material and containing separated foam forming precursors, to thereby mix the precursors and form foam and wherein the bag has been warmed to a temperature above ambient temperature prior (sometimes just prior) to the agitation.

The method comprises placing foam precursors in separate portions of a bag formed from plastic film material. As described above, the step of placing the foam precursors in separate portions of the bag preferably comprises forming frangible seals between the foam precursors. In turn, the step of mixing the previously separated foam precursors comprises rupturing the frangible seals that separate the foam precursors from one another in the bag. As further illustrated and discussed above, the method preferably comprises manipulating the exterior of the bag to rupture the interior frangible seals and mix the foam precursors.

It has additionally been discovered, however, that preheating the bag reduces or eliminates the necessity for a complex mixing machine in situations where such is desirable or necessary.

The warming step can comprise adding thermal energy in a number of alternative fashions; e.g. microwave, induction, radio frequency ("RF"), radiant, resistance heating, fluidized bed heating, ultrasonic heating, infrared heating, conduction and free or forced convection. As an example, for some combinations of foam precursors, the increased molecular energy doubles the rate of the form foaming chemical reaction for approximately every 10° C. rise in temperature. The higher temperature also decreases the viscosity of the compositions. Each of these factors, taken individually and collectively permit the foam forming chemical reaction to move forward with minimal external agitation. Furthermore, by putting energy into the foam precursors before they are mixed, the foam quality is less susceptible to problems associated with incomplete physical mixing.

Additionally, the step of warming the bag eliminates the problems associated with cold environments; i.e. when foam-in-place chemicals are used in colder environments, the foam forming characteristics are generally less advantageous. In typical circumstances, foam formation tends to be rather poor starting at temperatures below about 60° F., and is almost useless below about 50° F. Thus, warming the chemicals to enhance the reaction offers particular advantages under such circumstances.

In preferred embodiments, the step of warming the bag above ambient temperature comprises limiting the warmed temperature of the bag and the precursors inside to temperatures lower than those that are functionally disadvantageous to later use of the bag and the foam precursors. For example, one of the well-recognized advantages of foam-in-place packaging is the time period or "window" during which the foam rises, but has not yet hardened. This window provides the opportunity to place the rising foam and an object to be packaged into a container together so that as the foam finishes rising, it will surround the object with a custom foam cushion. If the bag and precursors are warmed too much, however, the foam will rise and set too quickly, and render the time window so narrow as to be essentially useless, thus losing one of the advantages of foam-in-place packaging.

Additionally, overly-high temperatures could begin to degrade the foam precursors, or even soften the remainder of the bag material (i.e. polyethylene has a typical melting point around 220° F.).

Accordingly, it has been found preferable to warm the bag to temperatures of between about 80° F. and 160° F. (27° C.–71° C.), and most preferably to a temperature of about 120° F. and 49° C. At these temperatures, the foam exhibits a useful combination of the benefits of increased internal energy, along with a manageable time window before hardening.

It will be understood, however, that the optimum temperature will depend somewhat upon the particular compositions and combinations of the foam precursors used, and that in some circumstances, the composition of the foam precursors can be selected or tailored to complement the expected temperature to which the bag will be heated prior to mixing. In a similar manner, the heating step can be selected to reach a temperature that is most advantageous for the particular precursor compositions being used. If the precursors are warm enough (e.g. 140–160° F.), merely breaking the seals between them is sufficient to form satisfactory foam. Keeping the precursors at such temperatures may not always be desirable, however, because the higher temperature also encourages internal reactions prior to mixing and can make the bag too hot to handle easily.

As in the earlier described embodiments of the invention, one of the advantages of the self-contained cushion precursor is the capability of being maintained in storage until needed. Accordingly, the method aspects of the invention can further comprise the step of storing the bag containing the separated foam precursors at ambient temperatures prior to the steps of warming the bag and mixing the precursors.

Alternatively, the bags can be stored at a desired elevated temperature. Such pre-warmed bags can be used immediately as desired, or can be heated to a somewhat higher temperature prior to use. Storing the bags in a heated condition offers the advantage of having warmed bags ready for immediate use without further warming. As proviso, the number of bags that can be stored in a warmed condition will be limited by available space in any heating device, and the foamable compositions can degrade somewhat during extended storage at above-ambient temperatures. Alternatively, although storing the bags at ambient temperatures requires a further heating step, it minimizes temperature-related degradation during storage and eliminates the need for heated storage space.

Figure 10:
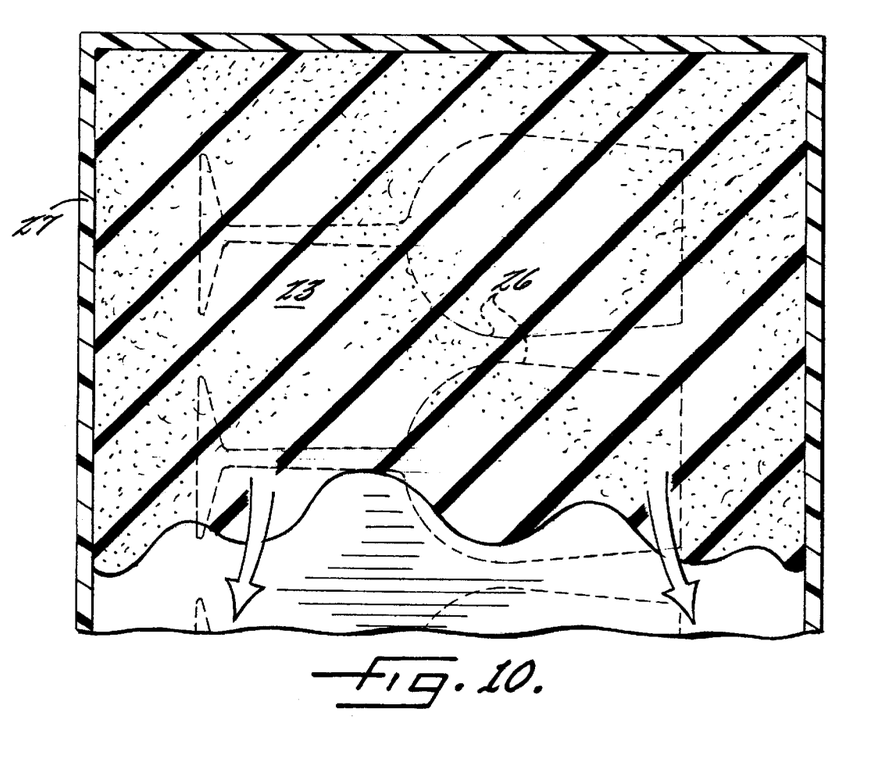
FIG. 10 is a cross-sectional view of a package with objects to be protected therein that incorporates a foam-in-place bag according to the present invention.

In another aspect, the invention comprises a method of packaging articles in foam-in-place packaging that is particularly useful for manual packaging operations. In this embodiment, the method comprises externally agitating a bag formed from plastic film material and containing separated foam forming precursors to thereby mix the precursors and form foam and wherein the bag has been warmed to a temperature above ambient temperature prior to the agitation, and thereafter placing the warmed bag with the foam precursors in a container, for example a corrugated box, with an object to be protected while the foam precursors are reacting to form foam so that the bag and resulting foam form a custom cushion for the object in the container. As already illustrated and discussed with respect to FIG. 10, a typical container is in the shape of a rectangular solid and is often formed of corrugated board. It will be understood, however, that neither the previously nor presently recited aspects and advantages of the invention are limited to use with such container shapes or materials.

Thus, in stepwise fashion the method comprises placing foam precursors in separate portions of a bag formed from plastic film material and closing the bag, thereafter warming the bag and the enclosed separated foam precursors to a temperature above ambient temperature, thereafter mixing the previously separated foam precursors, placing an object into a packaging container, and placing the warmed bag with the foam precursors in the container with the object to be protected while the foam precursors are reacting to form foam so that the bag and resulting foam form a custom cushion for the object in the container. As noted above, in typical circumstances, the method further comprises the step of closing the container after the bag has been placed therein.

Figures 11, 12, 13, 14:
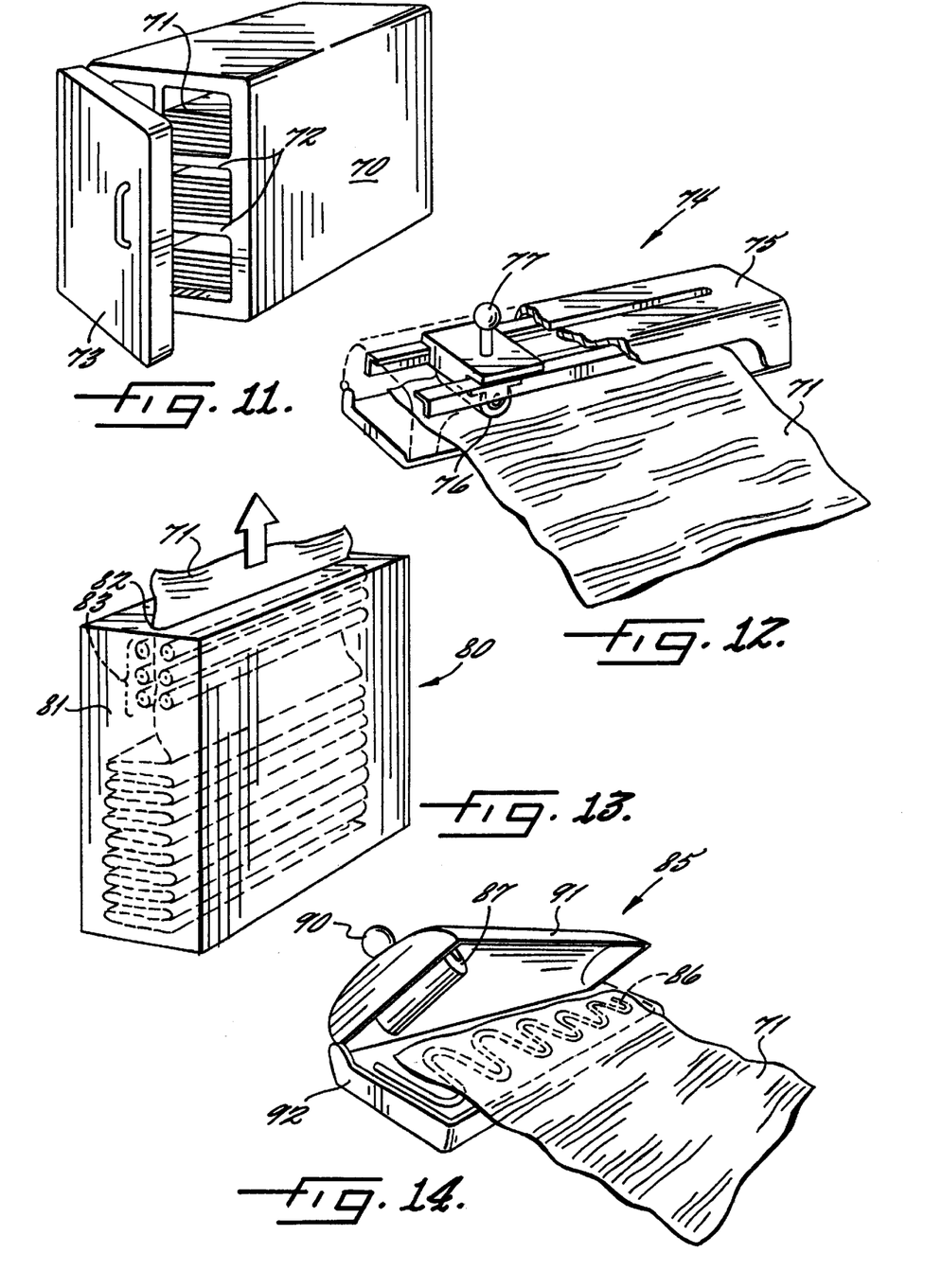
FIG. 11 is a perspective view of a warming device according to the present invention.
FIG. 12 is a perspective view of an alternative mixing device according to the present invention.
FIG. 13 is a perspective view of a combined warming and mixing device according to the present invention.
FIG. 14 is a perspective view of a second embodiment of a combined warming and mixing device according to the present invention.

FIGS. 11–15 illustrate additional aspects of the present invention. FIG. 11 illustrates a warming chamber 70 of a size and shape appropriate to hold a number of the cushion precursors 71 which in FIG. 11 are illustrated as resting on a plurality of shelves 72. The chamber 70 also includes a door 73. As noted above, there are a number of acceptable choices for warming the cushion precursors 71, any of which can be selected for use as an end-user finds appropriate or necessary, and these can be incorporated into the warming step of the invention without undue experimentation. Accordingly, the various warming techniques will not be discussed in further detail herein other than as is necessary to describe the invention.

FIG. 12 illustrates a mixing device broadly designated at 74 that can be appropriately used in conjunction with the warming chamber 70 illustrated in FIG. 11. The device 74 includes a housing 75, a roller 76, and a handle 77 for moving the roller 76 laterally within the housing 75. As FIG. 11 illustrates, the portions of the bag 71 holding the foam precursors behind the frangible seals are placed into the housing 75 after which a user can manipulate the roller 76 by moving the handle 77 to thereby break the interior seals and mix the foamable components. As noted above, because the foam precursors in warmed bag 71 already have an increased amount of kinetic energy, the mixing device 74 can be less sophisticated than for example the mixing device 30 illustrated in FIGS. 6, 7, and 8.

Indeed, it will be understood that the structure of the bag of the present invention provides the advantage of being mixed by hand or with other relatively simple mixing devices. For example, one such device (not shown) is formed by adding two hinged (preferably resiliently hinged) flaps to a baseboard. The composition-carrying portions of the bag are positioned on the baseboard and an operator strikes the bag using the hinged flaps. Other, equally straightforward devices can be designed and used for the same purpose.

FIG. 13 illustrates another apparatus broadly designated at 80 for enhancing the mixing of foam precursors in foam-in-bag systems. The apparatus 80 includes a heated chamber 81 (i.e. a chamber capable of being heated as may be desirable or necessary), along with an opening 82 for dispensing the bag cushion precursors 71 from the chamber 81. Mechanical mixing means shown as the rollers 83 are positioned between the heated chamber 81 and the opening 82 for mechanically manipulating the bag 71 as the bags 71 are dispensed from the chamber 81 to thereby mix the foam precursor compositions therein. Again, because the bags 71 and their contents are already warmed, the mixing means can be simpler and less sophisticated than those used when the bags are at ambient temperature. In preferred embodiments, the apparatus 80 further comprises at least one bag, and most preferably a plurality of bags, inside the chamber 81. As illustrated in FIG. 13, the bags can be individually folded to dispense after one another (in a manner analogous to household tissue) or connected with easily separated bindings such as perforations (in a manner analogous to a roll of paper towels).

In another embodiment (not shown) the rollers can be heated rather than the chamber. The net result, however, is the same, i.e. a heated bag that offers enhanced performance.

FIG. 14 illustrates another embodiment of a mixing apparatus broadly designated at 85 which includes a heating means shown as the conduction coil 86 as well as a roller 87 and a handle 90. The roller 87 and the handle 90 are inside a hinged housing formed by an upper portion 91 and a lower portion 92. The foam precursor-containing portions of the bag can be placed inside the housing 91 and 92 and warmed in place, following which the handle 90 can be manipulated to move the roller 87 across the bag 71 to break the frangible seals and mix the foam precursors.

Figure 15:
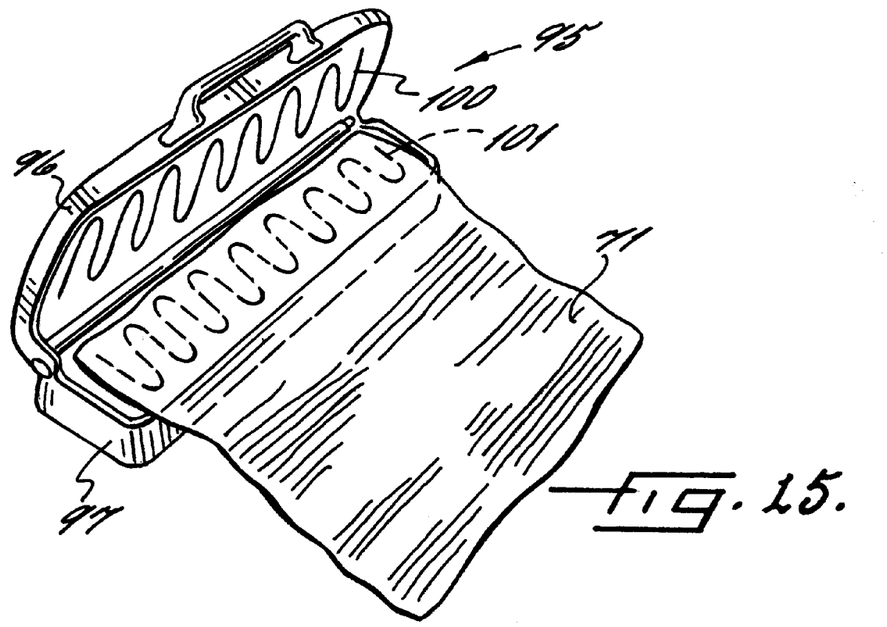
FIG. 15 is a perspective view of a second embodiment of a warming device according to the present invention.

Finally, FIG. 15 shows another relatively simple device broadly designated at 95 which warms foam precursors in the bag 71 but does not mechanically manipulate them. The device 95 is similarly formed of upper 96 and lower 97 housing portions and in the illustrated embodiment includes two heating coils 100 and 101, respectively.

It will thus be understood that the devices illustrated in FIGS. 11–15 offer a variety of options for the end user and yet all of which offer straightforward and reliable techniques for heating the cushion precursors and mixing the foam precursors inside.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed:

1. A method of enhancing the mixing of foam precursors in foam-in-bag precursor systems, to thereby enhance the quality of the resulting foam, the method comprising:

placing foam precursors in separate portions of a bag formed from a flexible barrier sheet material that is substantially impermeable to water vapor or other substances deleterious to the foam precursors;

thereafter warming the bag and the enclosed separated foam precursors to a temperature above ambient temperature sufficient to provide the energy required for good foam quality with repeatable yield; and thereafter mixing the previously separated foam precursors.

2. A method according to claim 1 wherein the step of warming the bag comprises warming the bag to a temperature between about 80° F. and 160° F. (27° C.–71° C.).

3. A method according to claim 1 wherein the step of warming the bag comprises warming the bag to a temperature of between about 120° F. (49° C.) and 130° F. (54.5° C.).

4. A method according to claim 1 wherein the step of warming the bag above ambient temperature comprises limiting the warmed temperature of the bag to temperatures lower than those that are functionally disadvantageous to later use of the bag and the foam precursors.

5. A method according to claim 1 wherein the step of placing the foam precursors in separate portions of the bag comprises forming a frangible seal between the foam precursors.

6. A method according to claim 5 wherein the step of mixing the previously separated foam precursors comprises rupturing the frangible seal that separates the foam precursors from one another in the bag.

7. A method according to claim 6 wherein the step of rupturing the frangible seals comprises manipulating the bag's exterior to rupture the frangible seals and mix the foam precursors.

8. A method according to claim 1 and further comprising the step of storing the bag and separated foam precursors at ambient temperatures prior to the steps of warming the bag and mixing the precursors.

9. A method according to claim 1 and further comprising the steps of:

placing the bag with the mixed precursors into a defined mold as the precursors are reacting; and maintaining the bag in the mold until the precursors have substantially finished expanding to thereby produce a bag with a defined three-dimensional geometry.

10. A method of packaging articles in foam-in-place packaging that is particularly useful for manual packaging operations, the method comprising:

placing foam precursors in separate portions of a bag formed from flexible barrier sheet material that is substantially impermeable to water vapor and other substances deleterious to the foam precursors and closing the bag;

thereafter warming the bag and the enclosed separated foam precursors to a temperature above ambient temperature sufficient to provide the energy required for good foam quality with repeatable yield;

thereafter mixing the previously separated foam precursors;

placing an object into a packaging container; and placing the warmed bag with the mixed foam precursors in the packaging container.

11. A method according to claim 10 wherein the step of warming the bag comprises warming the bag to a temperature of between about 80° F. and 160° F. (27° C.–71° C.).

12. A method according to claim 10 wherein the step of warming the bag comprises warming the bag to a temperature of between about 120° F. (49° C.) and 130° F. (54.5° C.).

13. A method according to claim 10 wherein the step of warming the bag above ambient temperature comprises limiting the warmed temperature of the bag to temperatures lower than those that are functionally disadvantageous to later use of the bag and the foam precursors.

14. A method according to claim 10 and further comprising the step of storing the bag and separated foam precursors at ambient temperatures prior to the steps of warming the bag and mixing the precursors.

15. A method according to claim 10 and further comprising the step of closing the container after the bag has been placed therein.

* * * * *

UNITED STATES PATENT AND TRADEMARK OFFICE
CERTIFICATE OF CORRECTION

PATENT NO.    : 6,272,813 B1
DATED         : August 14, 2001
INVENTOR(S)   : Sperry et al.

It is certified that error appears in the above-identified patent and that said Letters Patent is hereby corrected as shown below:

<u>Title page,</u>
Item [56] References Cited, U.S. PATENT DOCUMENTS,
Line 21, "Butler" should read -- Bast --.
Item [56] References Cited, U.S.PATENT DOCUMENTS, insert the following,
-- 4,226,330    10/1980    Butler
   5, 794,406   08/1998    Feichental et al.
   4,198,166    04/1980    Tuns
   5,857,312    01/1999    Walden
   5,287,676    02/1994    Erbse et al.
   5,727,370    03/1998    Sperry --.

Signed and Sealed this

Fourteenth Day of May, 2002

*Attest:*

*Attesting Officer*

JAMES E. ROGAN
*Director of the United States Patent and Trademark Office*